US011942286B2

(12) United States Patent
Liu et al.

(10) Patent No.: US 11,942,286 B2
(45) Date of Patent: Mar. 26, 2024

(54) KNOB SWITCH HAVING DIFFERENT GEAR POSITIONS AND LIGHT GUIDE

(71) Applicant: Phoenix Contact Asia-Pacific (Nanjing) Co., Ltd., Nanjing (CN)

(72) Inventors: Jinge Liu, Nanjing (CN); Yue Yu, Nanjing (CN); Jianlin Wu, Nanjing (CN)

(73) Assignee: Phoenix Contact Asia-Pacific (Nanjing) CO., LTD., Nanjing (CN)

(*) Notice: Subject to any disclaimer, the term of this patent is extended or adjusted under 35 U.S.C. 154(b) by 95 days.

(21) Appl. No.: 17/788,720

(22) PCT Filed: Nov. 11, 2020

(86) PCT No.: PCT/CN2020/127991
§ 371 (c)(1),
(2) Date: Jun. 23, 2022

(87) PCT Pub. No.: WO2021/129206
PCT Pub. Date: Jul. 1, 2021

(65) Prior Publication Data

US 2023/0029588 A1 Feb. 2, 2023

(30) Foreign Application Priority Data

Dec. 24, 2019 (CN) ......................... 201911346495.2

(51) Int. Cl.
*H01H 19/14* (2006.01)
*H01H 19/02* (2006.01)

(52) U.S. Cl.
CPC .......... *H01H 19/025* (2013.01); *H01H 19/14* (2013.01)

(58) Field of Classification Search
CPC ...... H01H 19/025; H01H 19/14; H01H 19/11; H01H 19/585; H01H 19/58; H01H 19/62;
(Continued)

(56) References Cited

U.S. PATENT DOCUMENTS

| | | | |
|---|---|---|---|
| 4,175,220 | A | 11/1979 | Johnston et al. |
| 6,872,905 | B2 | 3/2005 | Kuepper et al. |

(Continued)

FOREIGN PATENT DOCUMENTS

| | | | |
|---|---|---|---|
| CN | 1341264 A | 3/2002 | |
| CN | 203560788 U | 4/2014 | |

(Continued)

OTHER PUBLICATIONS

International Search Report and Written Opinion of International Application No. PCT /CN2020/127991, and partial translation thereof, dated Feb. 18, 2021, 10 pp.

*Primary Examiner* — Ahmed M Saeed
(74) *Attorney, Agent, or Firm* — Shumaker & Sieffert, P.A.

(57) ABSTRACT

A rotary knob switch can include: a knob head; a fixing mount disposed below the knob head and configured to allow at least a portion of the bottom of the knob head to pass through it; cam located at the bottom of the fixing mount and to be mated with the bottom of the knob head, a side of the cam forming at least one protruding control curved surface; and a slider, said slider being coaxial with the cam, ramp with different heights being provided along edge of the slider, wherein, when the cam rotates, the control curved surface of the cam presses the ramp of the slider, such that the slider slides along axial direction towards the bottom of the rotary knob switch, the knob head comprises an indicator block, the lower part of the indicator block is provided with an axial light guide column.

19 Claims, 9 Drawing Sheets

(58) Field of Classification Search
CPC ...... H01H 19/635; H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01
See application file for complete search history.

(56) References Cited

U.S. PATENT DOCUMENTS

| | | | | |
|---|---|---|---|---|
| 7,514,643 | B1 * | 4/2009 | Tittle | H01H 13/023 200/314 |
| 9,583,287 | B2 * | 2/2017 | Zheng | H01H 13/80 |
| 2003/0150701 | A1 * | 8/2003 | Kuepper | H01H 11/0006 200/43.08 |
| 2003/0226747 | A1 * | 12/2003 | Groves | H01H 13/585 200/527 |

FOREIGN PATENT DOCUMENTS

| | | | |
|---|---|---|---|
| CN | 108172442 | A | 6/2018 |
| CN | 207601670 | U | 7/2018 |
| CN | 211743023 | U | 10/2020 |

* cited by examiner

Three gear positions, left self-locking, right self-resetting

60° left rotation

Zero position

45° right rotation

Cam with two gear positions, right self-locking

Zero position

60° right rotation

Cam with two gear positions, left 45°and right 45°

KNOB SWITCH HAVING DIFFERENT GEAR POSITIONS AND LIGHT GUIDE

This application is a national stage application under 35 U.S.C. § 371 of International Application No. PCT/CN2020/127991, filed Nov. 11, 2020, which claims priority of Chinese Patent Application No. 201911346495.2, filed Dec. 24, 2019. The entire contents of each of Application Nos. PCT/CN2020/127991 and CN 201911346495.2 are incorporated herein by reference in their respective entireties.

TECHNICAL FIELD

The present disclosure relates to a rotary knob switch, and more particularly, to a rotary knob switch with a light guide and having different gear positions.

BACKGROUND

There are many types of electrical switches on the market today, one of which is the rotary knob switch. Most rotary knob switches adopt a fixed design, involving only a specific gear position, which is not flexible and cannot well meet the many specific use scenarios of intelligent manufacturing. Meanwhile, in order to facilitate the user's on-site observation, a rotary knob switch that can emit light has appeared on the market. The light-emitting effect of the traditional light-emitting rotary knob switch is generally single-point local light-emitting, and the light-emitting effect is not friendly for the user to observe the electrical switch from all directions and angles. A recent prior art involves a rotary knob switch that includes a operation handle that is uniformly illuminated by an internal light source. In this patent solution, a light-conductive guide component made of plastic is accommodated in the rotating handle, and the light emitting surface of the light-conductive guide component includes a first section and a second section facing different directions. In order to direct the light from the conical light-conductive guide to the first and second sections, two different reflection surfaces in the form of grooves are provided in the light-conductive guide component. Although this structure achieves uniform light emitting in multiple directions, the manufacture of the light-conductive guide component (especially, the manufacture of two grooves to form an accurate shape and positioning) is relatively complicated.

There is a need for a solution of knob with light guide, having a simpler and more reliable structure.

SUMMARY

The present disclosure relates to a rotary knob switch including: a knob head; a mount disposed below the knob head and configured to allow at least a portion of the bottom of the knob head to pass through it; cam located at the bottom of the mount and to be mated with the bottom of the knob head, such that the cam is capable of being rotated under the control of the knob head, a side of the cam forming at least one protruding control curved surface; and a slider, said slider being coaxial with the cam, ramp with different heights being provided along edge of the slider, wherein, wherein when the cam rotates, the control curved surface of the cam presses the ramp of the slider, such that the slider slides along axial direction towards the bottom of the rotary knob switch, the knob head comprises an indicator block, the lower part of the indicator block is provided with an axial light guide column, the indicator block further comprises a light guide reflection structure, the light guide reflection structure comprises: a light-emitting top surface corresponding to the top of the knob head, a light-incident bottom surface opposite to the top surface, a light-emitting side surface corresponding to a outer side of the knob head, an inner side surface opposite to the light-emitting side surface, and left and right sides corresponding to left and right sides of the knob head, the inner side surface of the light guide reflection structure comprises a main reflection slope for the first reflection of light from the light guide column, the light guide reflective structure further comprises a hollow hole for the secondary reflection of a least a portion of the light reflected by the main reflection slope, such that the light incident into the light guide reflection structure through the light guide column is emitted from the light-emitting top surface and the light-emitting side surface.

The rotary knob switch described above, wherein positions of the main reflection slope and the light guide column are configured such that light incident from the light guide column substantially propagates towards the light-emitting side surface after being at least partially reflected by the main reflection slope.

The rotary knob switch described above, wherein the hollow hole is configured not to reflect the light incident from the light guide column, but to secondarily reflect the light reflected by the main reflection slope, such that the light reflected by the secondary reflection substantially propagates towards the light-emitting top surface.

The rotary knob switch described above, wherein the hollow hole is in an ellipse shape, and a long axis of the ellipse forms an acute angle with respect to horizontal direction.

The rotary knob switch described above, wherein the inner side surface of the light guide reflection structure further comprises a auxiliary reflection slope which is closer to the light-emitting top surface than the main reflection slope, and a horizontal transition section and a vertical transition section are provided between the main reflection slope and the auxiliary reflection slope.

The rotary knob switch described above, wherein a pit structure is provided where the horizontal transition section and the vertical transition section of the inner side surface intersect.

The rotary knob switch described above, wherein concave direction of the pit structure is directed toward the light-emitting side surface.

The rotary knob switch described above, wherein said auxiliary reflection slope is to be used for further dispersing the straight-line propagation of light from the light guide column.

The rotary knob switch described above, wherein the pit structure is to be used for further dispersing the straight-line propagation of light from the light guide column.

The rotary knob switch described above, wherein the knob head further comprises a surface cover mated with the indicator block, the indicator block and the surface cover are assembled together by a connecting mechanism.

The rotary knob switch described above, wherein the rotary knob switch further comprises a knob handle, and wherein the bottom of the surface cover comprises an upper barb, the lower portion of the indicator block comprises an upper barb, and the knob handle comprise therein an upper barb that hooks the upper barb of the surface cover and the upper barb of the indicator block, so as to assemble the knob handle, the surface cover and the indicator block together.

The present disclosure also relates to a rotary knob switch comprising: a knob head; a mount disposed below the knob head and configured to allow at least a portion of the bottom of the knob head to pass through it; cam located at the bottom of the mount and to be mated with the bottom of the knob head, such that the cam is capable of being rotated under the control of the knob head, a side of the cam forming at least one protruding control curved surface; and a slider, said slider being coaxial with the cam, ramp with different heights being provided along edge of the slider, wherein, wherein when the cam rotates, the control curved surface of the cam presses the ramp of the slider, such that the slider slides along axial direction towards the bottom of the rotary knob switch, and a slider-reset spring to provide an axial restoring elastic force for the slider, wherein the cam comprises a variety of interchangeable models, the slider comprises a variety of interchangeable models, such that in the case of only the slider and the cam being replaced, different rotation gear position types are realized through a structural cooperation of the fixing mount, the cam and the slider, and at least one of a self-locking function and a self-resetting function is provided.

The rotary knob switch described above, wherein the slider comprises: a lighted slider or a non-lighted slider; when the slider is a lighted slider, the lighted slider comprises a hollow structure for allowing light to pass therethrough; when the slider is a non-lighted slider, the bottom of the non-lighted slider comprises a connected support ribs.

The rotary knob switch described above, wherein the slider comprises at least one of the following various control ramps: self-locking ramp, the top of the self-locking ramp having a groove capable of supporting the lower edge of the control curved surface of the cam, thereby maintaining self-locking after a rotational force to the knob is released; self-resetting ramp, the self-resetting ramp having a bump on its top, and wherein the height of the self-resetting ramp is configured such that when the control curved surface of the cam reaches the top of the ramp, the further rotation of the cam is limited by the bump on the top of the self-resetting ramp, thereby rotating reversely to reset when the rotational force to the knob is released.

The rotary knob switch described above, wherein the slider comprises at least two control ramps, the at least two control ramps are of the same type of control ramps, or a combination of a self-locking ramp and a self-resetting ramp, or the slider consists of two slider components combined with each other, one of the two slider components having self-locking ramp and the other having self-resetting ramp.

The rotary knob switch described above, wherein the mount 112 is provided with angle-limiting block inside it, an edge of top of the cam is provided with boss, and the cooperation of the angle-limiting block with the cam defines an angular limit to which the cam can rotate.

The rotary knob switch described above, wherein a limit position to which the control curved surface of the cam can move along the self-resetting ramp defines an angular limit to which the cam can rotate.

The rotary knob switch described above, wherein in a case of the slider having a self-locking ramp: when the rotary knob is rotated from zero position such that the control curved surface of the cam contacts the self-resetting ramp of the slider, the control curved surface of the cam presses the self-resetting ramp to cause it move downward and when the boss of the cam hits the angle-limiting block inside the mount and is blocked, the rotary knob is at a first rotation angle, and at this moment a lower end of the control curved surface of the cam is snapped into the groove on the top of the self-locking ramp to realize the self-locking of the rotary knob at the first rotation angle position; in a case where the slider has a self-resetting ramp: the self-resetting ramp further comprises a vertical rib on its outer surface, an inner side of the sleeve comprises a groove, wherein the vertical rib is embedded in the groove in the sleeve; when the rotary knob is rotated such that the control curved surface of the cam contacts with the self-resetting ramp of the slider, the control curved surface of the cam compresses the self-resetting ramp to cause it move downwards, at which point the spring is compressed; when the control curved surface of the cam reaches the top of the self-resetting ramp, the bump on the top of the self-resetting ramp prevents the control curved surface of the cam from rotating further over the top of the self-resetting ramp, and at this moment the vertical rib moves to the bottom surface of the groove to restrict the self-resetting ramp from continuing to descend and restrict the cam from continuing to rotate, thereby reaching a second rotation angle; when the rotating force to the knob is released, the restoring force of the spring makes the vertical rib leave the bottom surface of the groove in the sleeve, and the cam is reversely rotated from the second rotation angle to reset.

The rotary knob switch described above, wherein bottom of the knob head comprises a protrusion shape, and the cam comprises a groove inside it, when assembled, the protrusion shape of the bottom of the knob head is capable of snapping into the groove in the cam to prevent reverse assembly, and the knob head on the side comprises structure with hole, the inner side of the cam comprises a barb, the structure with hole of the knob head with is capable of being barbed to the barb of the cam, to prevent the relative up-and-down movement between the knob head and the cam.

The rotary knob switch described above, wherein the knob head comprises a indicator block transparent to light, a lower portion of the indicator block is provided with an axial light guide column, the indicator block further comprises a light guide reflection structure, the light guide reflection structure is to be used for the first reflection of the light incident into the light guide reflection structure through the light guide column, and for the secondary reflection of part of the first reflected light, such that the reflected light is emitted from the light-emitting top surface and the light-emitting side surface.

BRIEF DESCRIPTION OF DRAWINGS

In order to further clarify the various examples of the disclosure, a more specific description of the various examples of the disclosure will be presented with reference to the accompanying drawings. It is understood that these drawings depict only typical examples of the disclosure and are therefore not to be considered limiting of the scope of the disclosure as claimed.

In addition, the main connection relationships of various components, instead of all of the connection relationships, are shown in the drawings, and the components and connections in the drawings are not necessarily drawn to actual scale.

DETAILED DESCRIPTION

The following detailed description refers to the accompanying drawings. The drawings show, by way of illustration, specific examples in which the claimed subject matter may be practiced. It should be understood that the following specific examples are intended to specifically describe typical examples for the purpose of explanation, but should not be construed as the limiting of the present disclosure; those skilled in the art, under the premise of fully understanding the spirit of the present disclosure, can make appropriate modifications and adjustments to the disclosed examples without departing from the spirit and scope of the claimed subject matter.

In the following detailed description, numerous specific details are set forth in order to provide a thorough understanding of the various described examples. However, it will be apparent to one of ordinary skill in the art that the various described examples may be practiced without these specific details. Unless otherwise defined, technical and scientific terms used herein shall have the same meaning as commonly understood by one of ordinary skill in the art.

The terms "first", "second", etc. in the description and claims of the present application do not imply any order, quantity, or importance, but are only used to distinguish different components. An example is an exemplary implementation or example. References in the specification to "an example", "one example", "some examples", "various examples" or "other examples" mean that a particular feature, configuration, or characteristic described in connection with the examples is included herein at least some, but not necessarily all, examples of the technology. The various appearances of "an example", "one example" or "some examples" are not necessarily all referring to the same examples. Elements or aspects from one example may be combined with elements or aspects from another example.

Figure 1:
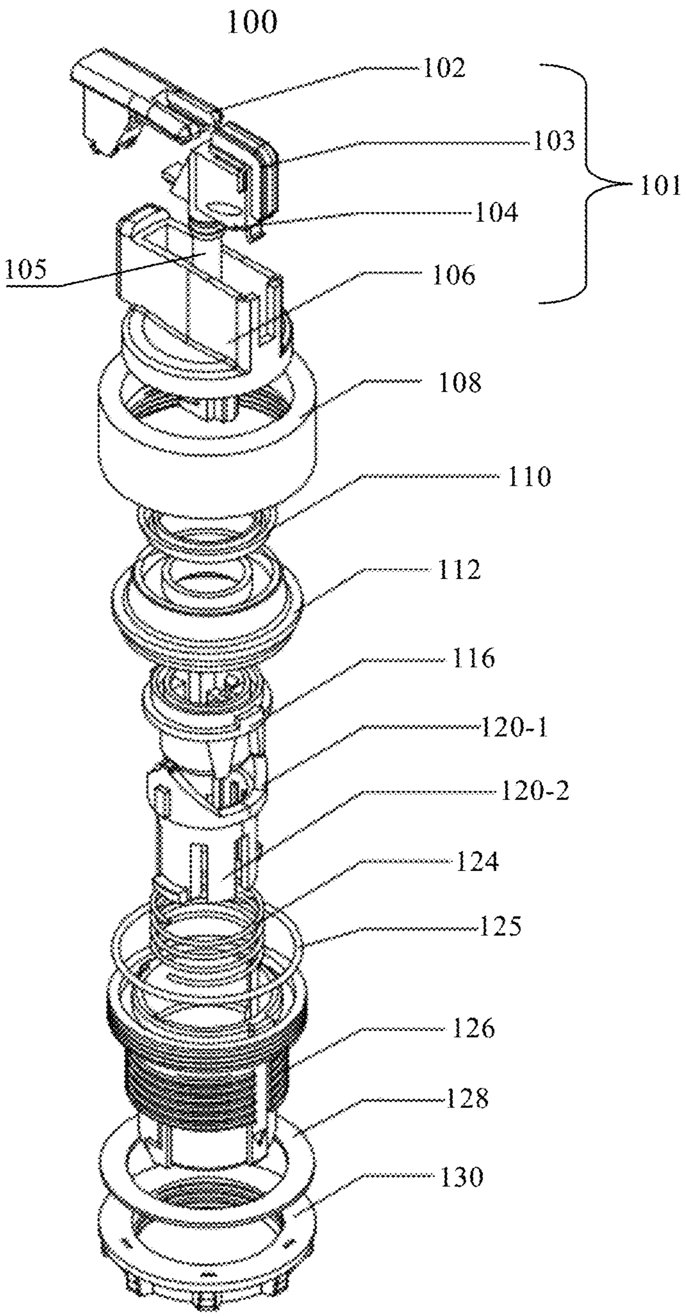
FIG. 1 is an exploded view of a rotary knob switch according to an example of the present disclosure.
Figure 2A:
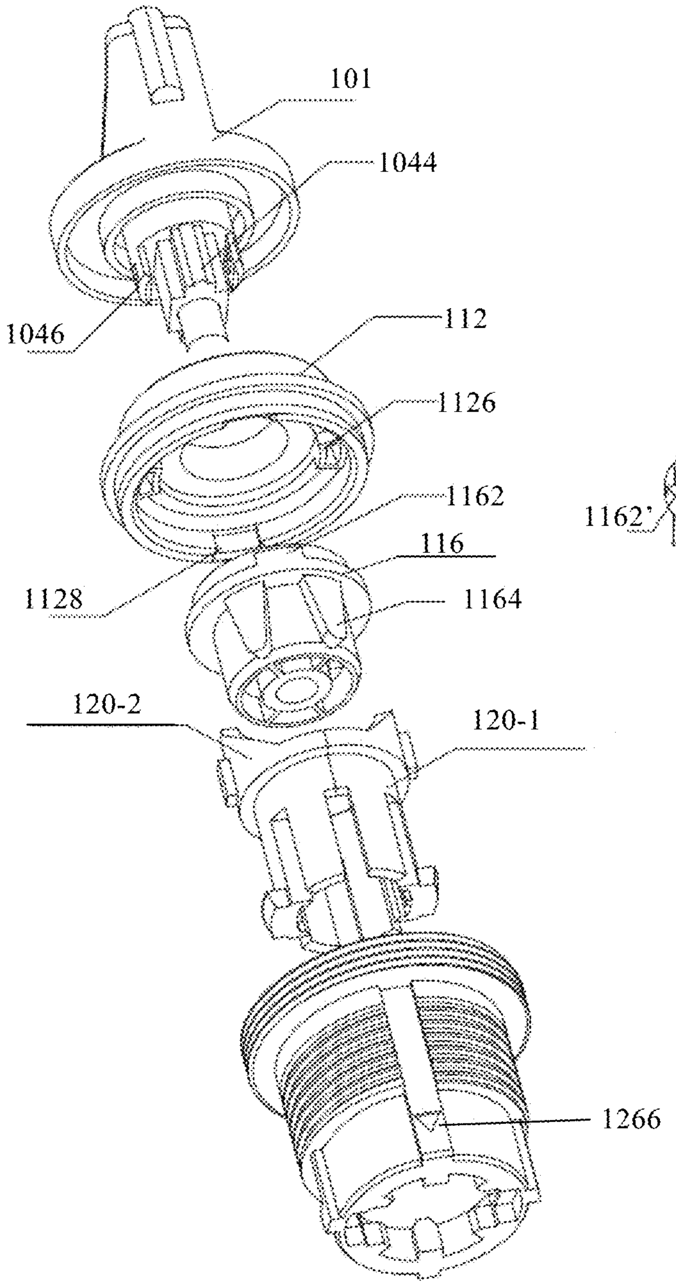
FIG. 2A shows an exploded view of a partially assembled rotary knob switch in accordance with one example of the present disclosure.
Figure 2B:
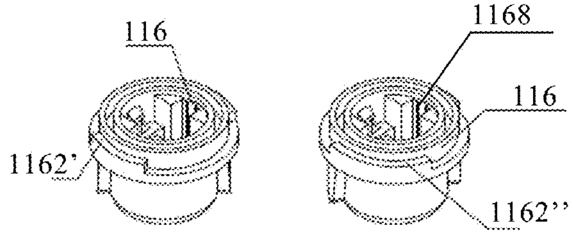
FIG. 2B shows a detail view of two cams for replacement according to one example of the present disclosure.
Figure 2C:
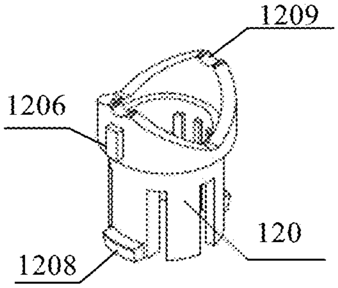
FIG. 2C shows a detail view of a slider according to one example of the present disclosure.

FIG. 1 is an exploded view of a rotary knob switch 100 according to one example of the present disclosure. FIGS. 2A-2C show an exploded view of a partially assembled rotary knob switch 200 and detail views of a portion of the components according to one example of the present disclosure. In combination with FIG. 1 and FIGS. 2A-2C, the rotary knob switch 100 may include a knob head 101. In one example, the knob head 101 may include one or more of: a surface cover 102; an indicator block 103, which can be assembled with the surface cover 102 and includes a light guide reflective structure therein, wherein the light emitted from the top and side of the indicator block 103 (for example, the directions of the light shown by the arrows in FIG. 3D) is used to indicate that the rotary knob switch 200 has light, a light guide column 105 is provided at the lower part of the indicator block 103, in a non-limiting example, the light guide column 105 can be integrally formed with the indicator block 103, and in another non-limiting example, the light guide column 105 is a separate part that can be removed from the indicator block 103; O-ring 104 of the indicator block, which is sleeved over the light guide column 105 for waterproofing; a knob handle 106, which is mated with the surface cover 102 and the indicator block 103 to form a complete knob head 101.

As shown in FIG. 2A, the bottom of the entire knob head 101 may have a protrusion shape 1044, which in one example may be substantially semi-cylindrical, or may be other shapes. The protrusion shape 1044 can be inserted into a groove 1168 inside the cam 116 as described below to be used to confirm orientation during assembly and thus prevent reverse assembly. In a case where the protrusion shape 1044 is semi-cylindrical, the groove in cam 116 may be a semi-cylindrical groove matching with it for receiving and matching the protrusion shape 1044. Coupling mechanism 1046 may also be included on the side of the bottom of the knob head 101. In one example, the coupling mechanism 1046 is a structure with hole, such as a square hole. The square hole 1046 can mate with barb 1166 (shown in FIG. 3A) of the cam 116 as described below for assembling them. For example, the structure 1046 with hole can be deformed and hung upside down at the barb 1166 of the cam 116 to prevent the relative up-and-down movement between the knob head 101 and the cam 116.

Figure 3A:
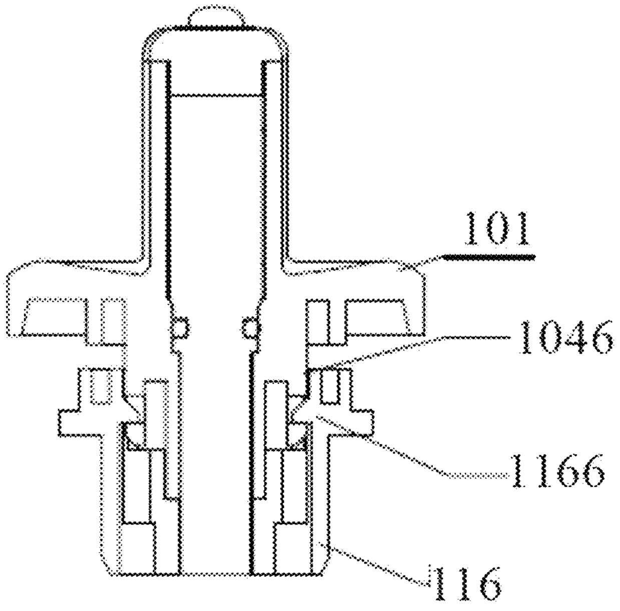
FIG. 3A shows a cross-sectional view of the top of the rotary knob switch according to one example of the present disclosure.
Figure 3B:
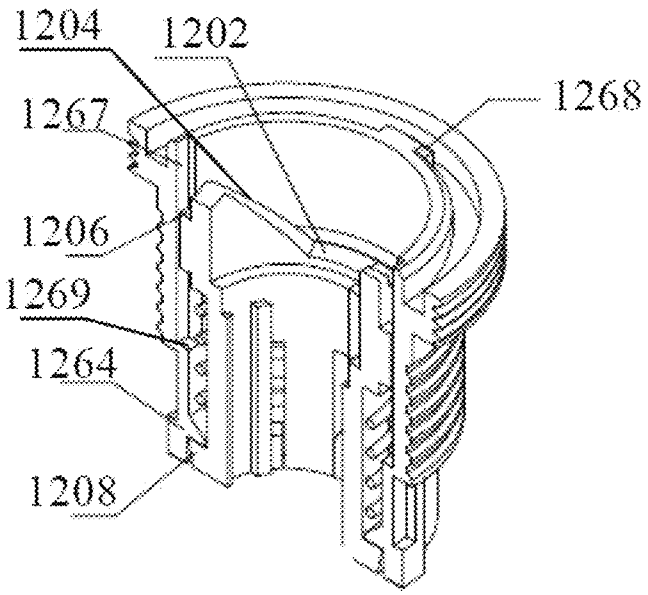
FIG. 3B shows a cross-sectional view of the bottom of the rotary knob switch according to an example of the present disclosure.
Figure 3C:
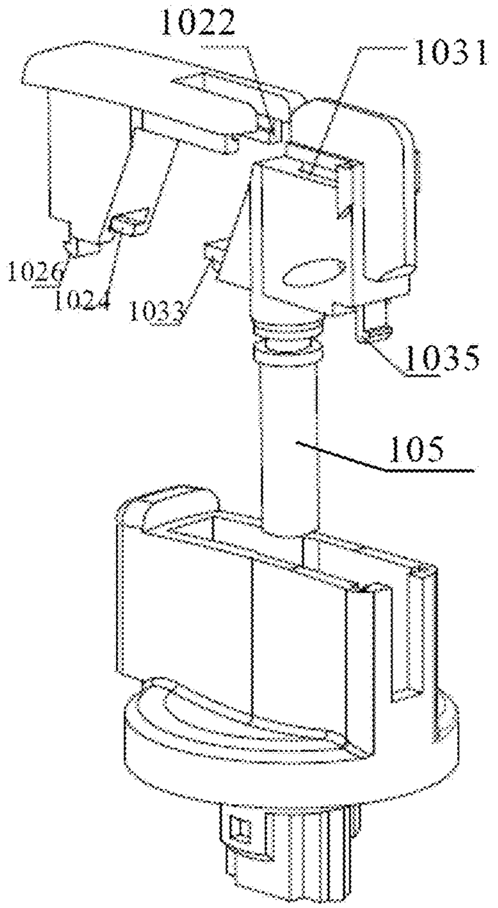
FIG. 3C shows a detailed exploded view of the top of the rotary knob switch according to one example of the present disclosure.
Figure 3E:
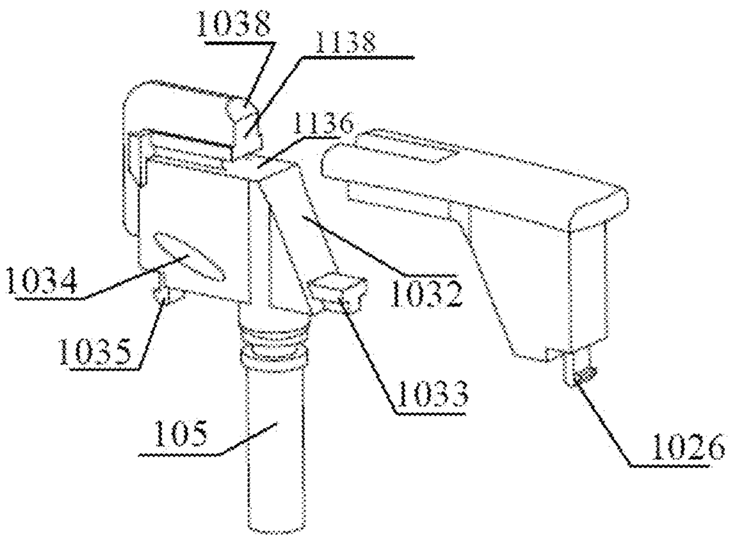
FIG. 3E shows another detailed exploded view of the top of the rotary knob switch according to one example of the present disclosure.
Figure 3D:
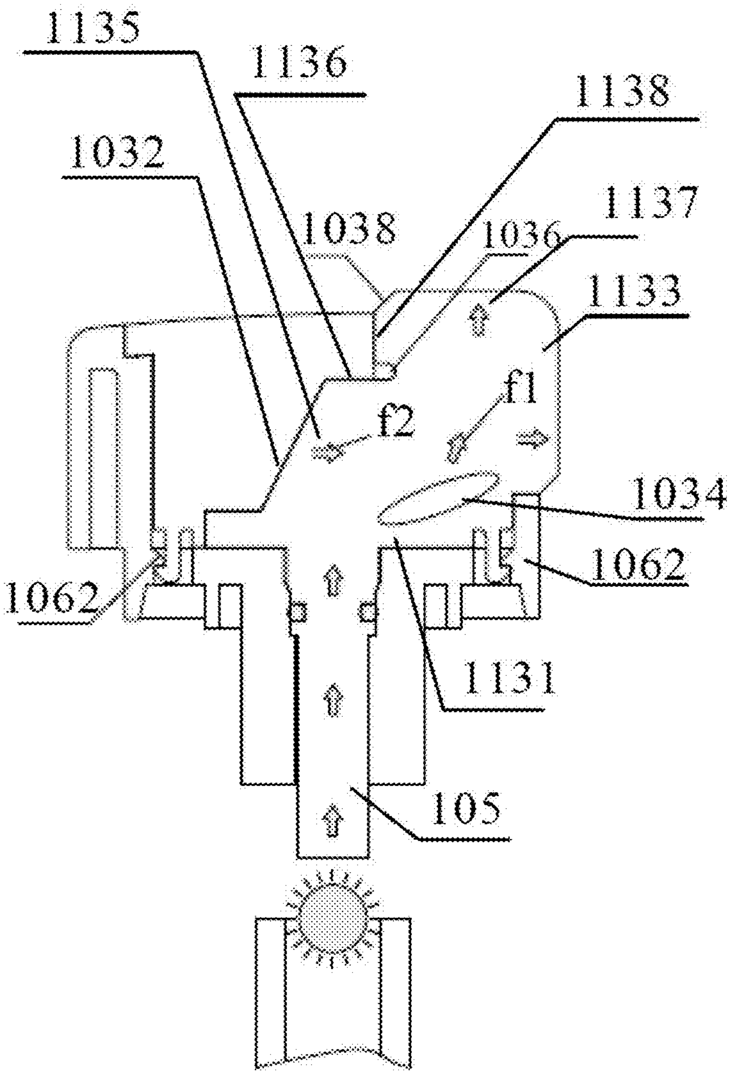
FIG. 3D shows a cross-sectional view of the top of a rotary knob switch with a light source and a schematic diagram of a light propagation path according to an example of the present disclosure.

One aspect of the present disclosure is embodied in the unique light guide reflection structure that the indicator block 103 has. As shown in FIG. 3D, incoming light can be propagating towards the bottom of the knob head 101, and the light is transmitted upward through the light guide column 105 along the arrow direction. The light propagating from the light guide column 105 are reflected and homogenized by the light guide reflection structure of the indicator block 103, such that the emitting light conducted through the upper and the side of the indicator block 103 is uniform. In one non-limiting example, the light source may be a module with light disposed below the rotary knob switch. In one example of the present disclosure, as shown in connection with FIG. 3D and FIG. 3E, the light guide reflection structure of the indicator block 103 may include one or more of the following features: the light guide reflection structure of the indicator block 103 has approximately the geometric shape of a hexahedron, which includes a light-emitting top surface 1137 (located on the top of the knob head), a light-incident bottom surface 1131 (where the light guide column is located) opposite to the light-emitting top surface, a light-emitting side surface 1133 (corresponding to the outer side of the knob head), and inner side surface 1135 opposite to the light-emitting side surface, and the left and right sides corresponding to the left and right sides of the knob head. Wherein, the inner side surface 1135 includes two slopes, which are the main reflection slope 1032 in the lower part and the auxiliary reflection slope 1038 in the upper part (closer to the light-emitting top surface), and the inner side surface 1135 also includes a horizontal transition section 1136 and a vertical transition section 1138 between the two reflection slopes, wherein the axially incident light from the light guide column 105 is at least partially reflected by the main reflection slope 1032, and after being reflected by the main reflection slope 1032, it is emitted to the light-emitting side surface 1133 along arrow f2 as shown in FIG. 3D. Further, a hollow hole 1034 is provided in the light guide reflection structure of the indicator block 103. The hollow hole 1034 can be, for example, in an ellipse shape, and the long axis of the ellipse forms an acute angle with respect to the horizontal direction. As shown in the example of FIG. 3D, the hollow hole 1034 deviates from the light incident path of the light guide column 105, and thus does not reflect light incident from the light guide column 105. However, the light in the direction f2 is produced through the refection by the main reflection slope 1032, and a part of the light in the direction f2 is further reflected into the light in the direction f1 through the hollow hole 1034, so as to be emitted to the light-emitting top surface 1137. Further as shown in FIG. 3D, where the horizontal transition section 1136 and the vertical transition section 1138 of the inner side surface 1135 intersect, a pit (groove) structure 1036 is provided, and the concave direction of the pit structure 1036 can be directed toward the light-emitting side surface 1133. Both the pit structure 1036 and the auxiliary reflection slope 1038 can further disperse the bright spots of the light source at the top of the light guide column and soften the visual light source. More specifically, by arranging the pit structure 1036 and the auxiliary reflection slope 1038, the straight propagation of the light can be interrupted, such that the light transmitted from the indicator block is more uniform and thus more beautiful. Therefore, the present disclosure realizes the uniformity of light by using the hollow hole 1034 in the light guide reflection structure of the indicator block, the main reflection slope 1032, the pit structure 1036 and the auxiliary reflection slope 1038 on the inner surface. The light guide reflection structure can reduce material usage and the cost and complexity of process fabrication while achieving better uniform light-emitting effect. It should also be understood that, in the above-mentioned example, the auxiliary reflection slope 1038 and the pit structure 1036 are optional structures.

The indicator block 103 is also provided with structural features to facilitate assembly. For example, as shown in FIG. 3C, the indicator block 103 is provided with a groove structure 1031 and a convex coupling structure 1033. During assembly, the right-angled barb structures 1022 on the surface cover 102 are pushed into the groove structures 1031 in the indicator block 103, while the coupling mechanisms 1033 on the indicator block 103 are inserted into the features 1024 in the surface cover 102 for assembly to restrict the relative up and down movement of the surface cover 102 and the indicator block 103. When the light guide column 105 is a detachable single piece, the light guide column 105 is aligned with and pressed into a knob hole at the bottom of the indicator block 103. The barb 1026 of the surface cover 102 and the barb 1035 of the indicator block 103 simultaneously hook the lower barbs 1062 of the knob handle 106 (as shown in FIGS. 3C and 3D).

The rotary knob switch may also include a surface frame 108. The surface frame 108 may be internally provided with threads so as to cooperate and screw tightly with the threads on the periphery of the fixing mount 112. Other available means may also be used to connect the surface frame 108 to the fixing mount 112. In addition, the bottom of the knob head 101 can pass through the fixing mount 112 to be assembled with the cam 116 as described below, such that rotation of the knob head causes rotation of the cam 116, as described further below. As shown in FIG. 2A, one or more structures may be provided along the inner side of the fixing mount 112, for example, the angle-limiting block 1126 and the groove 1128 in FIG. 2A. In a non-limiting example of the present disclosure, the fixing mount 112 may include at least two angle-limiting blocks 1126 disposed opposite to each other, and four grooves 1128.

In an example of the present disclosure, a knob sealing ring 110 may be provided under the knob head 101 to achieve waterproof effect. The seal ring 110 may take the form of a V-ring seal and may be tightly coupled to the knob head 101 in various ways.

The rotary knob switch 100 may further include a cam 116. In one example of the disclosure, the cam 116 may be below the fixing mount and may be disposed concentrically with the fixing mount 112. Furthermore, as described above, the cam 116 may be tightly coupled to the bottom of the knob head 101 (which passes through the fixing mount 112).

The cam 116 may include one or more bosses 1162. The cooperation of the boss 1162 with the angle-limiting block 1126 inside the fixing mount 112 as described above defines the angular limit to which the cam 116 can rotate. In one example of the disclosure, the cam 116 may include two bosses 1162. In further examples, the bosses 1162 may be disposed opposite along the edge of the cam 116 (as shown in connection with the cross-sectional views of FIGS. 4A-4C). The boss 1162 of the cam 116 does not overlap with the angle-limiting block 1126 of the fixing mount 112, but is located between the two angle-limiting blocks 1126. As shown in connection with FIG. 2B, the bosses 1162', 1162" may extend along the circumference of the cam 116 for different lengths, so as to play different position-limiting roles. In addition, control curved surface 1164 is formed on the side surface of the cam 116. In one example, the cam 116 may have two control curved surfaces 1164. In one example of the present disclosure, as described above, the cam 116 can be closely matched with the bottom of the knob head 101 through a further connecting mechanism, such that the cam 116 is positioned relative to the knob head 101 and can rotate under the control of the knob head 101. For example, the protrusion shape 1044 on the bottom of the knob head 101 can be inserted into the groove 1168 in the cam 116. In the example where the protrusion shape 1044 is a semi-cylindrical shape, the groove 1168 of the cam 116 may be a semi-cylindrical groove that receives and mates the semi-cylindrical shape. Other mating shapes can also be used such that the knob head 101 and cam 116 fit together. Additionally, the knob head 101 and cam 116, when assembled with this assembly feature, may align with mark 1266 (e.g., the triangular mark shown in FIG. 2A) on the sleeve as described below, indicating the zero position of the rotary knob switch.

Figure 4A:
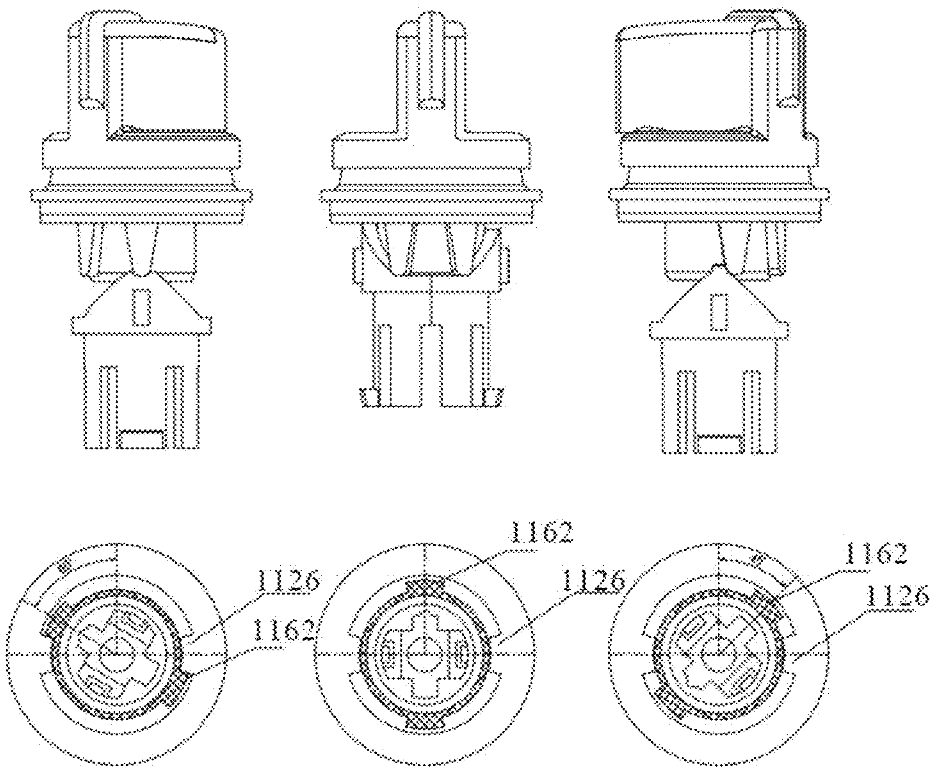
FIG. 4A, FIG. 4B and FIG. 4C illustrate schematic diagrams of the assembled rotary knob switch in three rotation gear position types and their rotation angles according to one example of the present disclosure.
Figure 4B:
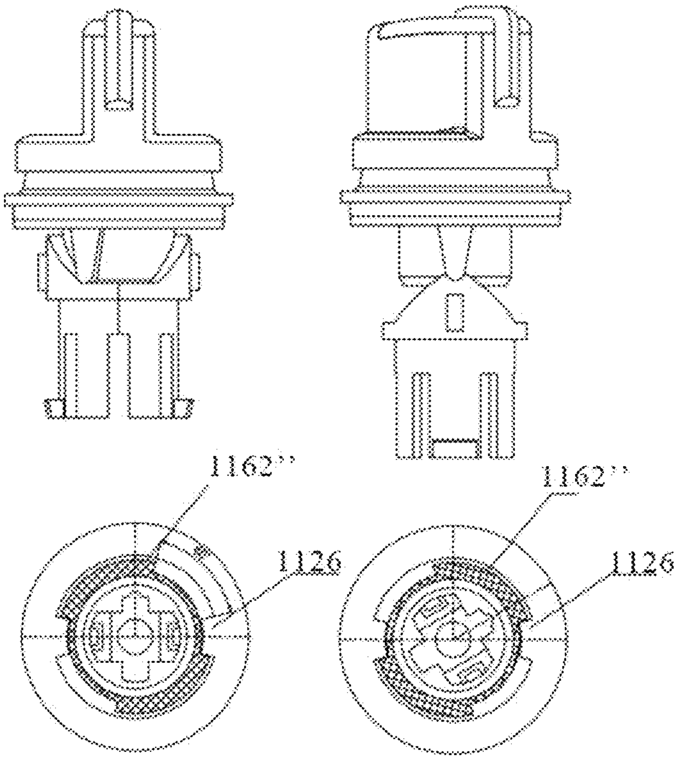
Figure 4C:
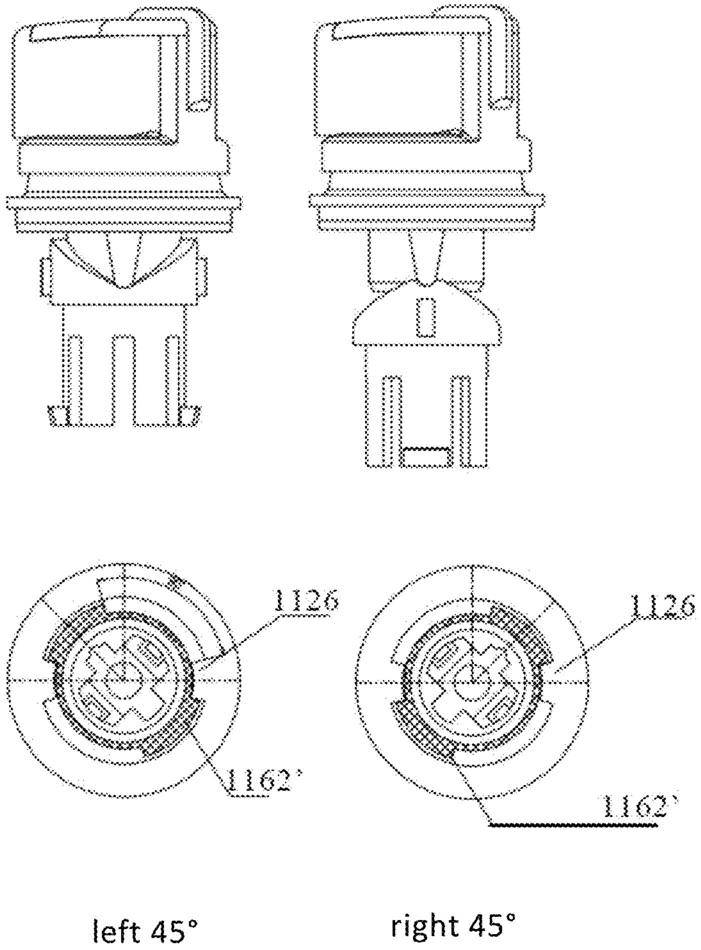

As a non-limiting example, FIG. 1 shows, for example, cam 116 for a three-position rotary knob switch (e.g., as shown in connection with FIG. 4A, with three positions of zero, 60° left rotation, and 45° right rotation), the cam 116 on the left side of FIG. 2B shows, for example, cam for a two-position rotary knob switch (for example, 45 degrees for left and right, as shown in FIG. 4C), and the cam 116 on the right side of FIG. 2B shows cam for a two-position rotary knob switch, for example, which can correspond to the rotation angle in FIG. 4B.

The rotary knob switch 100 may further include a slider 120. Slider 120 may be coaxial with cam 116. Slider 120 may include ramps 1204 (FIG. 3B) with varying heights along the edges of the slider 120. When the cam 116 rotates, the control curved surface 1164 of the cam 116 presses the ramps 1204 of the slider 120, such that the slider 120 slides toward the bottom of the rotary knob switch 100 in the axial direction. The rotary knob switch 100 may further include a slider-reset spring 124 which is used to provide an axial restoring elastic force for the movement of the slider 120. For example, in connection with FIG. 3B, in an exemplary example of the present disclosure, the control curved surface 1164 of the cam 116 can be placed on the ramp 1204 of the slider 120. When the control curved surface 1164 of the cam 116 is rotated under the driving of the knob, the ramp 1204 can be pressed down, such that the slider 120 also as a whole moves downward accordingly.

In one example of the present disclosure, the slider 120 includes at least one of the following control ramps: a self-locking ramp on the half 120-1 of the slider 120, the top of the self-locking ramp has a groove 1209 capable of supporting the lower edge of the control curved surface 1164 of the cam 116 to maintain self-locking after the rotational force to the knob is released; the self-resetting ramp on the other half 120-2 of the slider 120, wherein the self-resetting ramp can have a bump on its top, and the height of the self-resetting ramp is configured such that when the control curved surface 1164 of the cam 116 reaches the top of the ramp, the further rotation of the cam 116 is already limited by the bump on the top of the self-resetting ramp, thereby rotating reversely to reset when the rotational force to the knob is released.

The slider 120 according to the present disclosure may include at least two control ramps (in this case the slider may be an integrally formed slider), and the at least two control ramps may be the same type of control ramps (as shown in FIG. 2C, the two ramps are self-locking ramps, thus forming self-locking sliders), or a combination of self-locking ramp and self-resetting ramp. The slider 120 can also be formed by combining two slider components, wherein one 120-1 of the two slider components has a self-locking ramp, and the other 120-2 has a self-resetting ramp. The limit position to which the control curved surface 1164 of the cam 116 can move along the self-resetting ramp (blocked by the bump on the top of the self-resetting ramp) can define the angular limit to which the cam 116 can rotate. In addition, the outer surface of the ramp of the slider 120 may include vertical ribs 1206. The vertical ribs can be inserted into the grooves 1267 in the inner wall of the sleeve 126. At the angular limit position of the self-resetting ramp, the vertical rib 1206 can move to the bottom surface 1269 of the groove 1267, and the bottom surface 1269 restricts the slider 120 and its self-resetting ramp from continuing to descend, and thus also restricts the cam 116 from continuing to rotate.

In one example of the present disclosure, in the case of the slider 120 having a self-locking ramp: when the knob head 101 is rotated from the zero position such that the control curved surface 1164 of the cam 116 contacts the self-locking ramp of the slider 120, the control curved surface 1164 of the cam 116 presses the self-locking ramp to move downward, and when the boss 1162 of the cam 116 hits the angle-limiting block 1126 inside the fixing mount 112 and is blocked, the knob is at the first rotation angle, and at this moment, the lower end of the control curved surface 1164 of the cam 116 is snapped into the groove 1209 on the top of the self-locking ramp to realize the self-locking of the knob at the first rotation angle position.

In the case of the slider having a self-resetting ramp: when the knob head 101 is rotated such that the control curved surface 1164 of the cam 116 contacts the self-resetting ramp of the slider 120, the control curved surface 1164 of the cam 116 presses the self-resetting ramp to cause it move downward, and at this moment the spring 124 is compressed; when the control curved surface 1164 of the cam 116 reaches the top of the self-resetting ramp, the bump on the top of the self-resetting ramp prevents the control curved surface 1164 of the cam 116 from rotating further over the top of the self-resetting ramp, and at this moment, the vertical rib 1206 moves to the bottom surface 1269 of the groove 1267 to restrict the self-resetting ramp from continuing to descend and restrict the cam 116 from continuing to rotate, so as to reach the second rotation angle; when the rotating force to the knob is released, the restoring force of the spring 124 makes the vertical rib 1206 leave the bottom surface 1269 of the groove 1267 in the sleeve 126, and the cam 116 is reversely rotated from the second rotation angle to reset.

Figure 3F:
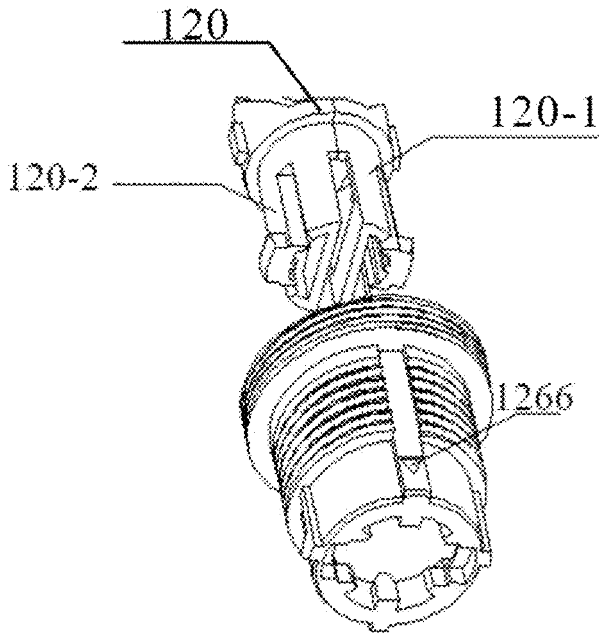
FIG. 3F shows a perspective view including a slider and a sleeve according to one example of the present disclosure.

In an example of a module with a light below the rotary knob switch, the slider may accordingly be a lighted slide, wherein the lighted slider may be a hollow structure (as in FIG. 2A) to allow light to pass through. In the example of a module without a light below the rotary knob switch, the slider can be correspondingly a non-lighted slider, which is not provided with a hollow structure which allows light to pass through, but can be other structures, for example, the bottom of the non-lighted slider can be connected support ribs, such as the bottom surface is two semicircular structures (as shown at the bottom of the slider 120 in FIG. 3F), or the bottom surface is a cross structure (not shown), and so on.

The rotary knob switch 100 may also include a O-ring 125 for the fixing mount (which may be used for the fixing mount), a rubber gasket 128 and a fastening ring 130. As shown in FIG. 3A and FIG. 3B, during the assembling process, the slider-reset spring 124 can be mounted from the bottom of the slider 120, and the barb 1208 of the slider 120 prevents the return spring 124 for the slider from popping out. After the vertical rib 1206 on the surface of the slider 120 is aligned with the groove 1267 in the inner wall of the sleeve 126, the barb 1208 of the slider 120 is pushed to snap into the groove 1264 of the sleeve 126. The control curved surface of the cam 116 may be placed on the flat surface 1202 of the slider 120 shown in FIG. 3B during the initial assembly process. As described above, in the case where the slider 120 is composed of two separate sliders, the two separate sliders can be assembled separately using this method. In the case of an integrally formed slider 120, the entire slider 120 may be mounted in a similar assembly principle but as a whole.

As mentioned above, the sleeve 126 may have a mark 1266 of a triangular groove, and the triangular groove 1266 on the sleeve 126 may be a reference for the initial position, from which rotation to the left can be left-rotation, and rotation to the right can be right-rotation. In addition, for example four grooves 1128 on the fixing mount 112 previously mentioned can be installed correspondingly with the bosses 1268 (for example, as shown in FIG. 2, correspondingly the number may also be four) of the sleeve 126, such that the rotation of the fixing mount 112 can be limited.

According to an example of the present disclosure, the cam 116 described above includes a variety of interchangeable models, and the slider 120 also includes a variety of interchangeable models, such that in the case of only the slider 120 and the cam 116 being replaced, the fixing mount 112, the cam 116 and the slider 120 cooperate with each other in structure to realize different rotation gear position types, and at least one of a self-locking function and a self-resetting function is provided.

FIG. 4A, FIG. 4B and FIG. 4C illustrate schematic diagrams of the assembled rotary knob switch in three rotation gear position types and their rotation angles according to one example of the present disclosure. As a non-limiting example, FIG. 4A shows a rotary knob switch of left self-locking and right self-resetting, with three gear positions, wherein the schematic diagram of the leftmost rotary knob in FIG. 4A and the cross-sectional view below it can correspond to 60 degrees of the left rotation of the knob, the schematic diagram of the rotary knob in the middle and the cross-sectional view below it can correspond to the zero position, and the schematic diagram of the rotary knob on the rightmost and the cross-sectional view below it can correspond to 45 degrees of right rotation. Also as a non-limiting example, FIG. 4B shows a rotary knob switch of right self-locking, with two gear positions, wherein the schematic diagram of the rotary knob and the cross-sectional view below it in FIG. 4B can correspond to the zero position of the rotary knob, and the schematic diagram of the rotary knob on the left and the cross-sectional view below it may correspond to 60 degrees of right rotation. Also as a non-limiting example, FIG. 4C shows a rotary knob switch of left self-locking and right self-locking, with two gear positions, wherein the schematic diagram of the rotary knob on the left in FIG. 4C and the cross-sectional view below it can correspond to the 45 degrees of left rotation of the rotary knob, the schematic diagram of the rotary knob on the right and the cross-sectional view below it can correspond to 45 degrees of right rotation. It can be understood that the above-mentioned left-right relationships are exemplary and relative, and these relative directions can be adjusted without departing from the design concept of the present disclosure.

As shown in connection with FIG. 4A, the slider 120 of FIG. 4A is a slider 120 that is a combination of a self-locking ramp and a self-resetting ramp, or formed by two slider components combined with each other with one of the two slider components having self-locking ramp and the other having self-resetting ramp.

When the boss (1162) of the cam is located in the middle of the angle-limiting blocks 1126 of the fixing mount, the rotary knob switch is in the zero position. Rotating the knob along one direction by a first angle (for example, 60 degrees to the left in FIG. 4A), when the control curved surface 1164 of the cam 116 contacts the self-locking ramp of the slider 120, the control curved surface 1164 of the cam 116 presses the self-locking ramp to move downward, and when the boss 1162 of the cam 116 hits the angle-limiting block 1126 inside the fixing mount 112 and is blocked, the knob is at a first rotation angle (for example, 60 degrees), and at this moment the lower end of the control curved surface 1164 of the cam 116 is snapped into the groove 1209 on the top of the self-locking ramp to realize the self-locking of the rotary knob at the first rotation angle position.

When the knob is rotated by a second angle in the opposite direction (e.g., 45 degrees to the right in FIG. 4A) which causes the control curved surface 1164 of the cam 116 contact the self-resetting ramp of the slider 120, the control curved surface 1164 of the cam 116 press the self-resetting ramp to move downward, and when the control curved surface 1164 of the cam 116 reaches the top of the self-resetting ramp, the bump on the top of the self-resetting ramp prevents the control curved surface 1164 of the cam 116 from rotating further over the top of the self-resetting ramp, and at this moment the vertical rib 1206 also moves to the bottom surface 1269 of the groove 1267 to restrict the self-resetting ramp from continuing to descend and to restrict the cam 116 from continuing to rotate, thereby achieving a second rotation angle (e.g., 45 degrees to the right in FIG. 3A).

When the rotational force to the rotary knob switch is released, the restoring force of the spring 124 causes the vertical rib 1206 to leave the bottom surface 1269 of the groove 1267 in the sleeve 126, and the cam 116 is reversely rotated from the second rotation angle to reset and return to the zero position.

In the case shown in FIG. 4A (three gear positions, the slider having self-resetting ramp and self-locking ramp), the cam 116 may include two control curved surfaces 1164. The two control curved surfaces 1164 may be placed relatively close, e.g., as shown in FIG. 2A. In one example, the spacing of the two control curved surfaces 1164 in FIG. 3A can be set such that: when one of the control curved surfaces 1164 presses down one (e.g., self-locking ramp, or self-resetting ramp) of the ramps of the slider, the other control curved surface 1164 (as in FIG. 2A) at least does not press down the other ramp (e.g., the self-resetting ramp, or the self-locking ramp), but, for example, is on the same side as the control curved surface 1164.

In the example of FIG. 4B, two gear positions, which are zero degree and 60 degrees to the right, are implemented. Specifically, the bosses (1162) on the top of the cam 116 are set to have a certain length extending around the top edge of the cam 116, such that when the two bosses (1162) on the top of the cam 116 respectively abut against the two angle-limiting blocks (1126) at the bottom of the fixing mount, the rotary knob switch is at the zero position; when the two bosses (1162) on the top of the cam respectively move in opposite directions and abut against the two angle-limiting blocks (1126) at the bottom of the fixing mount, the two control curved surfaces 1164 of the cam are respectively snapped into the grooves 1209 of the two self-locking sliders, such that the rotary knob switch is at a third rotation angle (60 degrees in this example) and realizes self-locking.

In the example of FIG. 4C, two gear positions, which are 45 degrees to the left and 45 degrees to the right, are implemented. The bosses (1162) on the top of the cam 116 is set to have a certain length extending around the top edge of the cam 116, such that when the two bosses (1162) on the top of the cam 116 abut against the two angle-limiting blocks (1126) at the bottom of the fixing mount 112 respectively, the control curved surface 1164 is in the recesses formed by the two self-locking ramps, such that the rotary knob switch is at a fourth rotation angle (for example, 45 degrees); when the two bosses (1162) on the top of the cam move in the opposite direction, respectively, the two control curved surfaces 1164 of the cam 116 are respectively snapped into the grooves 1209 on the top of the two self-locking ramps, such that the rotary knob switch 100 is at a fourth rotation angle (e.g., 45 degrees) in the opposite direction and realizes self-locking.

In the cases shown in FIGS. 4B and 4C (two gear positions, the slider having self-locking ramps), the cam 116 may include one control curved surface 1164. In a preferred example, the cam 116 may include two control curved surfaces to maintain balance when rotating. In the case where the cam 116 includes two control curved surfaces, the two control curved surfaces may be positioned opposite (as shown in FIGS. 2C and 2D) to better maintain balance as the cam rotates to press down the slider ramps.

It can be understood that the above angles are only examples rather than limitations, and other angles of rotation may be set without departing from the spirit of the present disclosure, and therefore other angles are also within the scope of the present application.

It should also be understood that the rotary knob switch 100 shown in the above examples is only exemplary examples of the rotary knob switch of the present disclosure. The rotary knob switch according to the present disclosure does not necessarily include or only includes all the components shown in the figures. It is contemplated that the rotary knob switch of the present disclosure may include more or fewer components, as long as they can achieve the corresponding functions.

What we claim is:

1. A rotary knob switch comprising:

a knob head;

a fixing mount disposed below the knob head and configured to allow at least a portion of a bottom of the knob head to pass through it;

a cam located at a bottom of the fixing mount and configured to be mated with the bottom of the knob head, such that the cam is configured to be rotated under the control of the knob head, a side of the cam forming at least one protruding control curved surface; and a slider, the slider being coaxial with the cam, and a ramp with different heights being provided along an edge of the slider, wherein, when the cam rotates, the control curved surface of the cam presses the ramp of the slider, such that the slider slides along an axial direction towards a bottom of the rotary knob switch, wherein the knob head comprises an indicator block, a lower part of the indicator block is provided with an axial light guide column, wherein the indicator block further comprises a light guide reflection structure, the light guide reflection structure comprises: a light-emitting top surface corresponding to a top of the knob head, a light-incident bottom surface opposite to the light-emitting top surface, a light-emitting side surface corresponding to an outer side of the knob head, an inner side surface opposite to the light-emitting side surface, and left and right sides corresponding to left and right sides of the knob head, and wherein the inner side surface of the light guide reflection structure comprises a main reflection slope for a first reflection of light from the light guide column, the light guide reflective structure further comprises a hollow hole for a secondary reflection of a least a portion of the light reflected by the main reflection slope, such that a light incident into the light guide reflection structure through the light guide column is emitted from the light-emitting top surface and the light-emitting side surface.

2. The rotary knob switch according to claim 1, wherein positions of the main reflection slope and the light guide column are configured such that light incident from the light guide column substantially propagates towards the light-emitting side surface after being at least partially reflected by the main reflection slope.

3. The rotary knob switch according to claim 1, wherein the hollow hole is configured not to reflect the light incident from the light guide column, and wherein the hollow hole is configured to secondarily reflect the light reflected by the main reflection slope, such that the light reflected by the secondary reflection substantially propagates towards the light-emitting top surface.

4. The rotary knob switch according to claim 1, wherein the hollow hole is in an ellipse shape, and a long axis of the ellipse forms an acute angle with respect to horizontal direction.

5. The rotary knob switch according to claim 1, wherein the inner side surface of the light guide reflection structure further comprises an auxiliary reflection slope which is closer to the light-emitting top surface than the main reflection slope, and a horizontal transition section and a vertical transition section are provided between the main reflection slope and the auxiliary reflection slope.

6. The rotary knob switch according to claim 5, wherein a pit structure is provided where the horizontal transition section and the vertical transition section of the inner side surface intersect.

7. The rotary knob switch according to claim 6, wherein a concave direction of the pit structure is directed toward the light-emitting side surface.

8. The rotary knob switch according to claim 5, wherein the auxiliary reflection slope is to be used for further dispersing a straight-line propagation of light from the light guide column.

9. The rotary knob switch according to claim 6, wherein the pit structure is configured to disperse a straight-line propagation of light from the light guide column.

10. The rotary knob switch according to claim 1, wherein the knob head further comprises a surface cover mated with the indicator block, the indicator block and the surface cover are assembled together by a connecting mechanism.

11. The rotary knob switch according to claim 10, wherein the rotary knob switch further comprises a knob handle, and wherein a bottom of the surface cover comprises an upper barb, a lower portion of the indicator block comprises an upper barb, and the knob handle comprise therein an upper barb that hooks the upper barb of the surface cover and the upper barb of the indicator block, so as to assemble the knob handle, the surface cover and the indicator block together.

12. A rotary knob switch comprising:

a knob head;

a fixing mount disposed below the knob head and configured to allow at least a portion of a bottom of the knob head to pass through it;

cam located at a bottom of the fixing mount and configured to be mated with the bottom of the knob head, such that the cam is configured to be rotated under the control of the knob head, a side of the cam forming at least one protruding control curved surface; and a slider, the slider being coaxial with the cam, and a ramp with different heights being provided along an edge of the slider, wherein when the cam rotates, the control curved surface of the cam presses the ramp of the slider, such that the slider slides along an axial direction towards a bottom of the rotary knob switch, and a slider-reset spring to provide an axial restoring elastic force for the slider, wherein the cam comprises a variety of interchangeable models, the slider comprises a variety of interchangeable models, such that in the case of only the slider and the cam being replaced, different rotation gear position types are realized through a structural cooperation of the fixing mount, the cam and the slider, and at least one of a self-locking function and a self-resetting function is provided, wherein:

the knob head comprises a indicator block transparent to light, a lower portion of the indicator block is provided with an axial light guide column, and the indicator block further comprises a light guide reflection structure, the light guide reflection structure is configured to be used for: a first reflection of the light incident into the light guide reflection structure through the light guide column, and a secondary reflection of part of the first reflected light, such that the reflected light is emitted from the light-emitting top surface and the light-emitting side surface.

13. The rotary knob switch according to claim 12, wherein the slider comprises:

a lighted slider or a non-lighted slider;

when the slider is a lighted slider, the lighted slider comprises a hollow structure for allowing light to pass therethrough;

when the slider is a non-lighted slider, the bottom of the non-lighted slider comprises a connected support ribs.

14. The rotary knob switch according to claim 12, wherein the slider comprises at least one of the following various control ramps:

a self-locking ramp, a top of the self-locking ramp having a groove capable of supporting a lower edge of the control curved surface of the cam, thereby maintaining self-locking after a rotational force to the knob is released;

a self-resetting ramp, the self-resetting ramp having a bump on a top of the self-resetting ramp, and wherein a height of the self-resetting ramp is configured such that when the control curved surface of the cam reaches the top of the self-resetting ramp, the further rotation of the cam is limited by the bump on the top of the self-resetting ramp, thereby rotating reversely to reset when the rotational force to the knob is released.

15. The rotary knob switch according to claim 14, wherein, the slider comprises at least two control ramps, the at least two control ramps are of the same type of control ramps, or a combination of a self-locking ramp and a self-resetting ramp, or the slider consists of two slider components combined with each other, one of the two slider components having self-locking ramp and the other having self-resetting ramp.

16. The rotary knob switch according to claim 14, wherein the fixing mount is provided with angle-limiting block inside it, an edge of top of the cam is provided with a boss, and the cooperation of the angle-limiting block with the cam defines an angular limit to which the cam can rotate.

17. The rotary knob switch according to claim 14, wherein a limit position to which the control curved surface of the cam can move along the self-resetting ramp defines an angular limit to which the cam can rotate.

18. The rotary knob switch according to claim 17, wherein in a case of the slider having a self-locking ramp:

when the rotary knob is rotated from zero position such that the control curved surface of the cam contacts the self-resetting ramp of the slider, the control curved surface of the cam presses the self-resetting ramp to cause it move downward and when a boss of the cam hits an angle-limiting block inside the fixing mount and is blocked, the rotary knob is at a first rotation angle, and at this moment a lower end of the control curved surface of the cam is snapped into the groove on the top of the self-locking ramp to realize the self-locking of the rotary knob at the first rotation angle position;

in a case where the slider has a self-resetting ramp:

the self-resetting ramp further comprises a vertical rib on an outer surface, an inner side of a sleeve comprises a groove, wherein the vertical rib is embedded in the groove in the sleeve;

when the rotary knob is rotated such that the control curved surface of the cam contacts with the self-resetting ramp of the slider, the control curved surface of the cam compresses the self-resetting ramp to cause it move downwards, at which point the spring is compressed;

when the control curved surface of the cam reaches the top of the self-resetting ramp, the bump on the top of the self-resetting ramp prevents the control curved surface of the cam from rotating further over the top of the self-resetting ramp, and at this moment the vertical rib moves to a bottom surface of the groove to restrict the self-resetting ramp from continuing to descend and restrict the cam from continuing to rotate, thereby reaching a second rotation angle;

when the rotating force to the knob is released, the restoring force of the spring makes the vertical rib leave the bottom surface of the groove in the sleeve, and the cam is reversely rotated from the second rotation angle to reset.

19. The rotary knob switch according to claim 12, wherein the bottom of the knob head comprises a protrusion shape, and the cam comprises a groove inside it, when assembled, the protrusion shape of the bottom of the knob head is capable of snapping into the groove in the cam to prevent reverse assembly, and the knob head on the side comprises structure with a hole, an inner side of the cam comprises a barb, the structure with the hole of the knob head with is capable of being barbed to the barb of the cam, to prevent the relative up-and-down movement between the knob head and the cam.

* * * * *